United States Patent [19]
Suciu

[11] Patent Number: 5,987,449
[45] Date of Patent: Nov. 16, 1999

[54] QUERIES ON DISTRIBUTED UNSTRUCTURED DATABASES

[75] Inventor: Dan Suciu, Mountainside, N.J.

[73] Assignee: AT&T Corporation, New York, N.Y.

[21] Appl. No.: 08/905,804

[22] Filed: Aug. 12, 1997

Related U.S. Application Data

[60] Provisional application No. 60/024,504, Aug. 23, 1996.

[51] Int. Cl.$^6$ ..................................................... G06F 17/30
[52] U.S. Cl. ........................................ 707/3; 707/2; 707/4
[58] Field of Search .......................................... 707/3, 4, 2

[56] References Cited

U.S. PATENT DOCUMENTS

| | | | |
|---|---|---|---|
| 5,418,942 | 5/1995 | Krawchuk et al. | 707/3 |
| 5,442,784 | 8/1995 | Powers et al. | 707/102 |
| 5,495,605 | 2/1996 | Cadot | 707/4 |
| 5,519,857 | 5/1996 | Kato et al. | 395/600 |
| 5,524,240 | 6/1996 | Barbara et al. | 395/600 |
| 5,564,119 | 10/1996 | Krawchuk et al. | 707/4 |
| 5,574,900 | 11/1996 | Huang et al. | 395/601 |
| 5,590,319 | 12/1996 | Cohen et al. | 707/4 |
| 5,598,559 | 1/1997 | Chaudhuri | 707/2 |
| 5,600,829 | 2/1997 | Tsatalos et al. | 395/602 |
| 5,600,831 | 2/1997 | Levy et al. | 395/602 |
| 5,606,690 | 2/1997 | Hunter et al. | 395/605 |
| 5,694,591 | 12/1997 | Du et al. | 707/2 |
| 5,701,460 | 12/1997 | Kaplan et al. | 707/3 |
| 5,864,842 | 1/1999 | Pederson et al. | 707/3 |
| 5,873,075 | 2/1999 | Cochrane et al. | 707/2 |

FOREIGN PATENT DOCUMENTS

| | | |
|---|---|---|
| 0 320 266 | 6/1989 | European Pat. Off. . |
| 2 172 130 | 9/1986 | United Kingdom . |

OTHER PUBLICATIONS

J. L. Wolf, J. Turek, M. Chen and P. S. Yu, "A Hierarchical Approach to Parallel Multiquery Scheduling," *IEEE Transactions on Parallel and Distributed Systems,* vol. 6, No. 6, Jun. 1995, pp. 578–589.

S. Chaudhuri and K. Shim, "Optimizing Queries with Aggregate Views," Advances in Database Technology, International Conference on Extending Database Technology Proceedings, Mar. 25, 1996, pp. 167–182.

*Primary Examiner*—Paul R. Lintz
*Assistant Examiner*—Jean Bolte Fleurantin
*Attorney, Agent, or Firm*—Oliff & Berridge, PLC

[57] ABSTRACT

A method and apparatus for applying a query to a database that is distributed into first portions. The query is first partially performed by terminals each containing one of the first portions. The results of the partial queries are recombined in such a way as to minimize the traffic among the terminals connected across networks. Paths of an edge-labeled tree representing the database connecting the first portions are expanded into subpaths corresponding to all the states of an automaton modeling the query. The database is distributed into second portions based on the automaton. Non-existing subpaths are ignored based on the automaton and which of the second portions the paths exit. Thus, the data transferred among first portions are minimized and the query process is optimized.

18 Claims, 8 Drawing Sheets

300

QUERIES ON DISTRIBUTED UNSTRUCTURED DATABASES

This nonprovisional application claims the benefit of U.S. provisional application No. 60/024,504 entitled "Query Decomposition and View Maintenance for Query Languages for Unstructured Data" filed on Aug. 23, 1996. The Applicant of the provisional application is Dan Suciu (Attorney Docket No. D. Suciu-1).

This Application is related to U.S. Patent Application entitled "View Maintenance For Unstructured Databases" (Attorney Docket No. D. Suciu 1) filed on even date herewith by the same inventors under common assignees.

BACKGROUND OF THE INVENTION

1. Field of Invention

This invention relates to queries of decomposed unstructured databases.

2. Description of Related Art

Databases that are distributed across networks are difficult and costly to query because a single terminal does not have immediate access to all portions of the database. This problem is especially aggravated when the database is unstructured because no assumptions are permitted regarding portions of the database not under immediate control. Thus, querying such a distributed database requires voluminous transfers of data and/or processing queries serially following the relationships of data in the database among terminals over the network as they are encountered. Accordingly, there is a need for an efficient technique to process queries of unstructured databases that are decomposed into separated portions where the portions are distance from each other (i.e. cannot immediately access more than one of the portions).

SUMMARY OF THE INVENTION

The invention provides a method and apparatus for applying a query to a database that is decomposed into first portions. The query represented by an expression may be first partially performed by terminals containing each of the first portions and then the results of the partial queries are recombined in such a way as to minimize the traffic among the terminals across a network.

To minimize data transfers among the terminals, paths of an edge-labeled tree representing the database that transition among the first portions are expanded into subpaths corresponding to all the states of an automaton that models a query expression of interest. The subpaths are reduced in number by eliminating those subpaths that cannot exist in view of the state of the automaton when the paths are encountered at boundaries of the first portions. The result of the above process is first transferred among the terminals to optimize process efficiency. The result of the partial queries may be optimized and data transfers among the terminals may be minimized.

BRIEF DESCRIPTION OF THE DRAWINGS

The invention is described in detail with reference to the following drawings wherein like numerals represent like elements, and wherein.

DETAILED DESCRIPTION OF PREFERRED EMBODIMENTS

Figure 1:
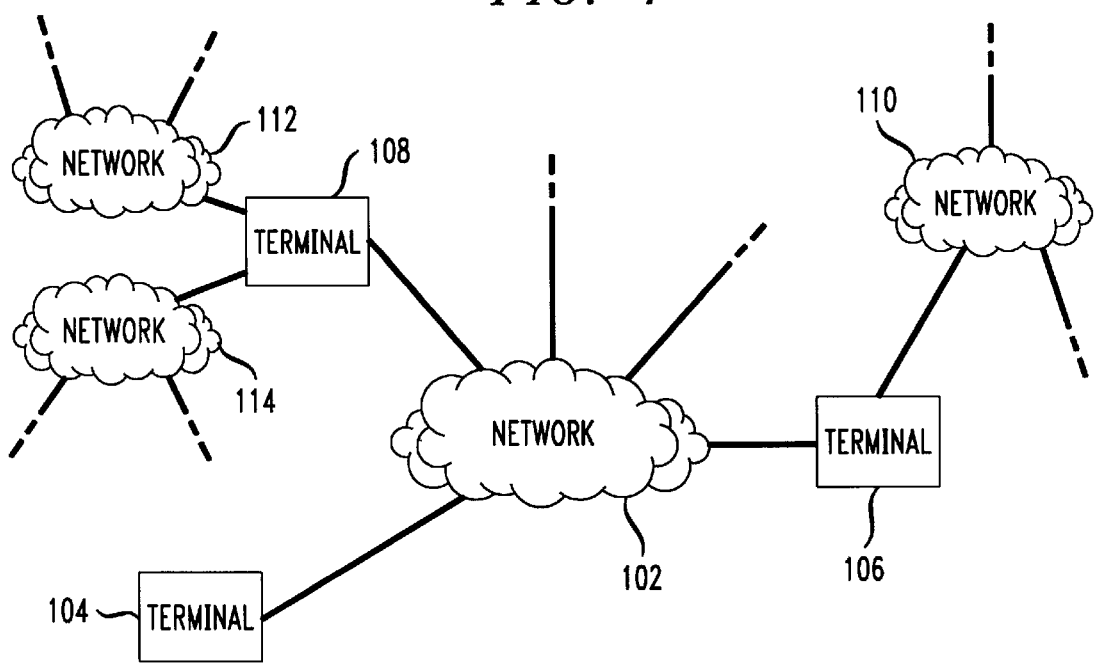
FIG. 1 is a diagram of a network example.

FIG. 1 shows terminals 104, 106 and 108 connected among networks 102, 110, 112 and 114. The networks 102, 110, 112 and 114 may represent intra-networks (or intranets) which are networks internal to an organization such as a corporation. When information contained within the intra-networks are desired, any one of the terminals may access the intra-networks through the appropriate network connections and begin searching for the desired information. The preferred embodiments provide techniques for logically decomposing the intra-networks into portions so that the amount of network traffic to construct a view of the intra-networks and an amount of processing required to maintain a view of the desired information are minimized.

Figure 2:
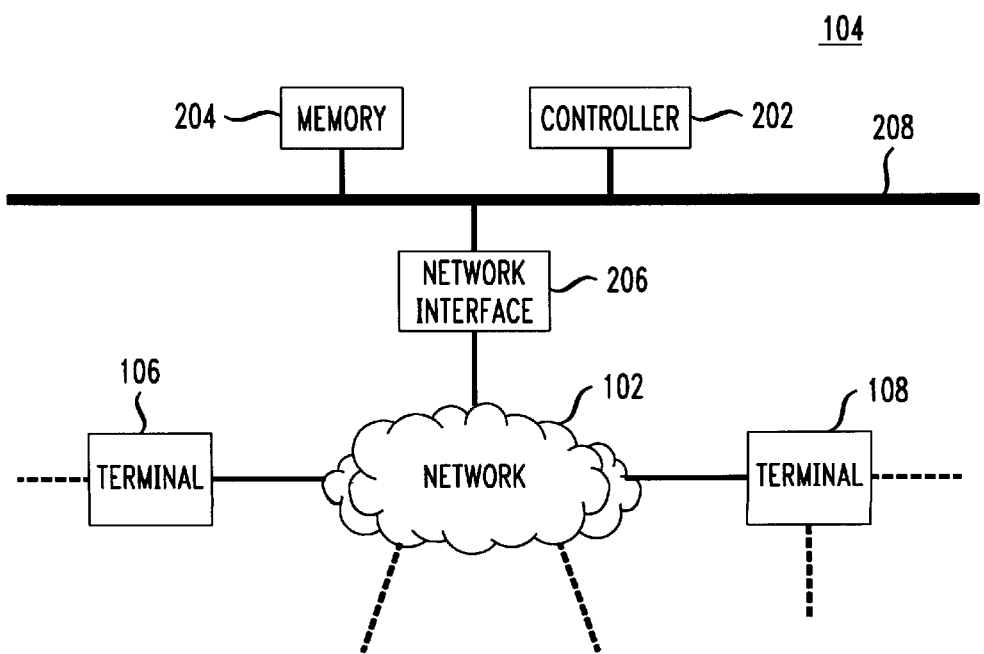
FIG. 2 is a block diagram of a terminal connected to one of the networks of FIG. 1.

FIG. 2 shows a block diagram of one of the terminals, terminal 104, for example. Terminal 104 includes a controller 202, a memory 204 and a network interface 206. The above components are coupled together via bus 208.

The terminal 104 is coupled to the network 102 through the network interface 206. The terminal 104 may search for the desired information from any network/terminals that is accessible through the network interface 206. The terminals 106 and 108 may be devices such as servers and routers and may contain the desired information. Thus, the network 102, 110, 112, and 114 as well as terminals 106 and 108 may be treated as a database that is modeled as an edge-labeled tree. The terminals 106 and 108 may be modeled as nodes of the edge-labeled tree and the path connecting the network interface 206 to a node may be modeled by the edges of the edge-labeled tree.

The edge-labeled tree also may be used to model the information contained in the networks and terminals. Thus, the path leading to the desired information and the information itself may be modeled by the edge-labeled tree. Accordingly, searching techniques for the desired information may be discussed in terms of the edge-labeled tree.

Figure 3:
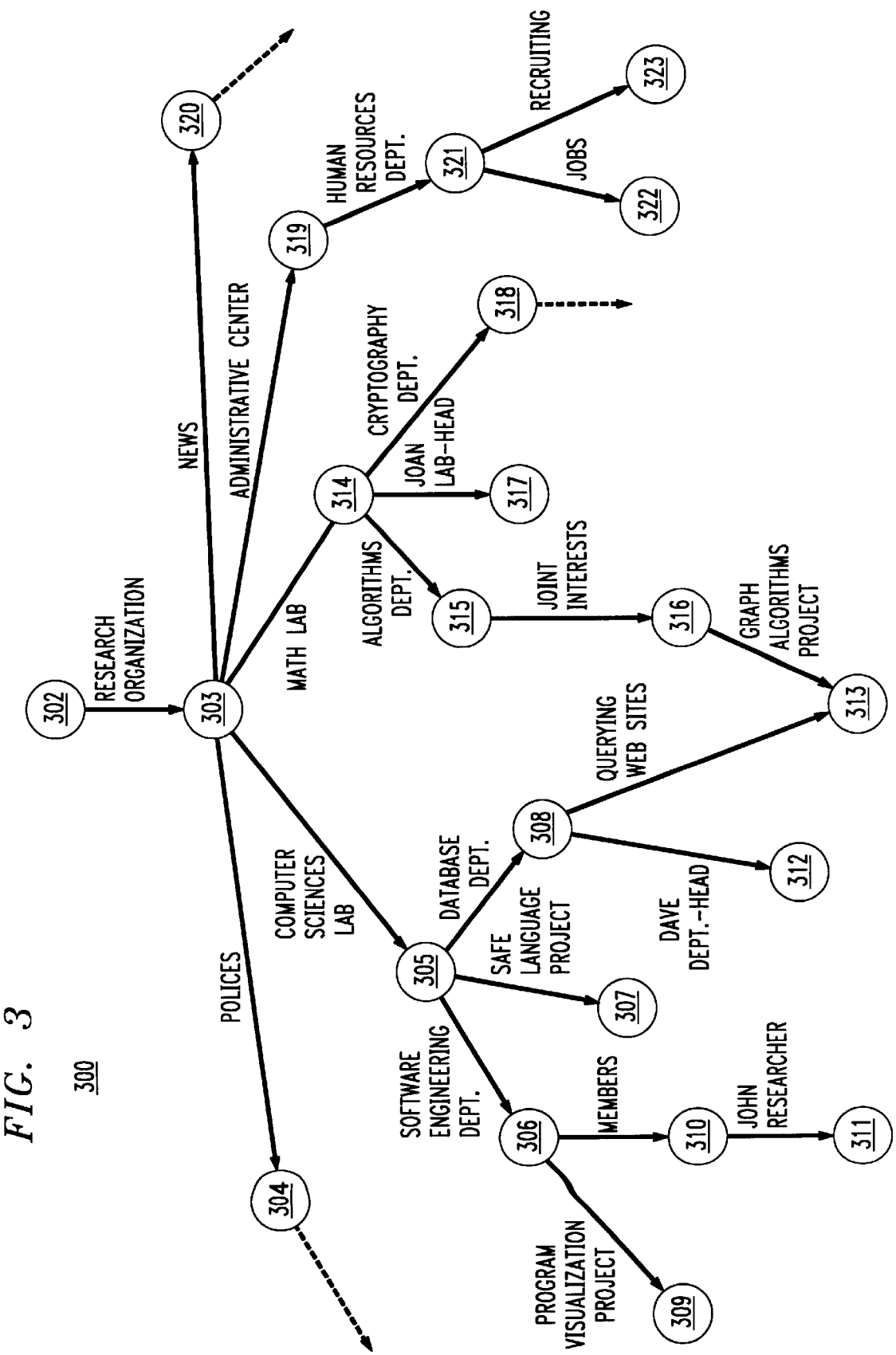
FIG. 3 is an edge-labeled tree modeling one of the networks shown in FIG. 1.

FIG. 3 shows an edge-labeled tree 300 modeling such a database. The edge-labeled tree 300 contains nodes 302–323 interconnected by edges which are labeled by specific edge labels. The terminal 104 searches information by traversing the edge-labeled tree 300. For example, node 302 is a root node and the terminal 104 may start at node 302 and begin accessing the information which are contained in the edge-labeled tree 300.

For example, a Research Organization edge emanates from the node 302 and terminates at node 303. Suborganization edges such as Policies, Computer Sciences Lab, Math Lab, Administrative Center and News emanate from the node 303. In addition, Software Engineering Department and Database Department occur after node 305 under Computer Sciences Lab and, similarly, Algorithms Department and Cryptography Department occur after node 314 under Math Lab. The same is true under Administrative Center. Thus, as the terminal 104 traverses the edge-labeled tree from node 302 to node 311, for example, the information that John Researcher is a member of the Software Engineering Dept is produced.

Figure 4:
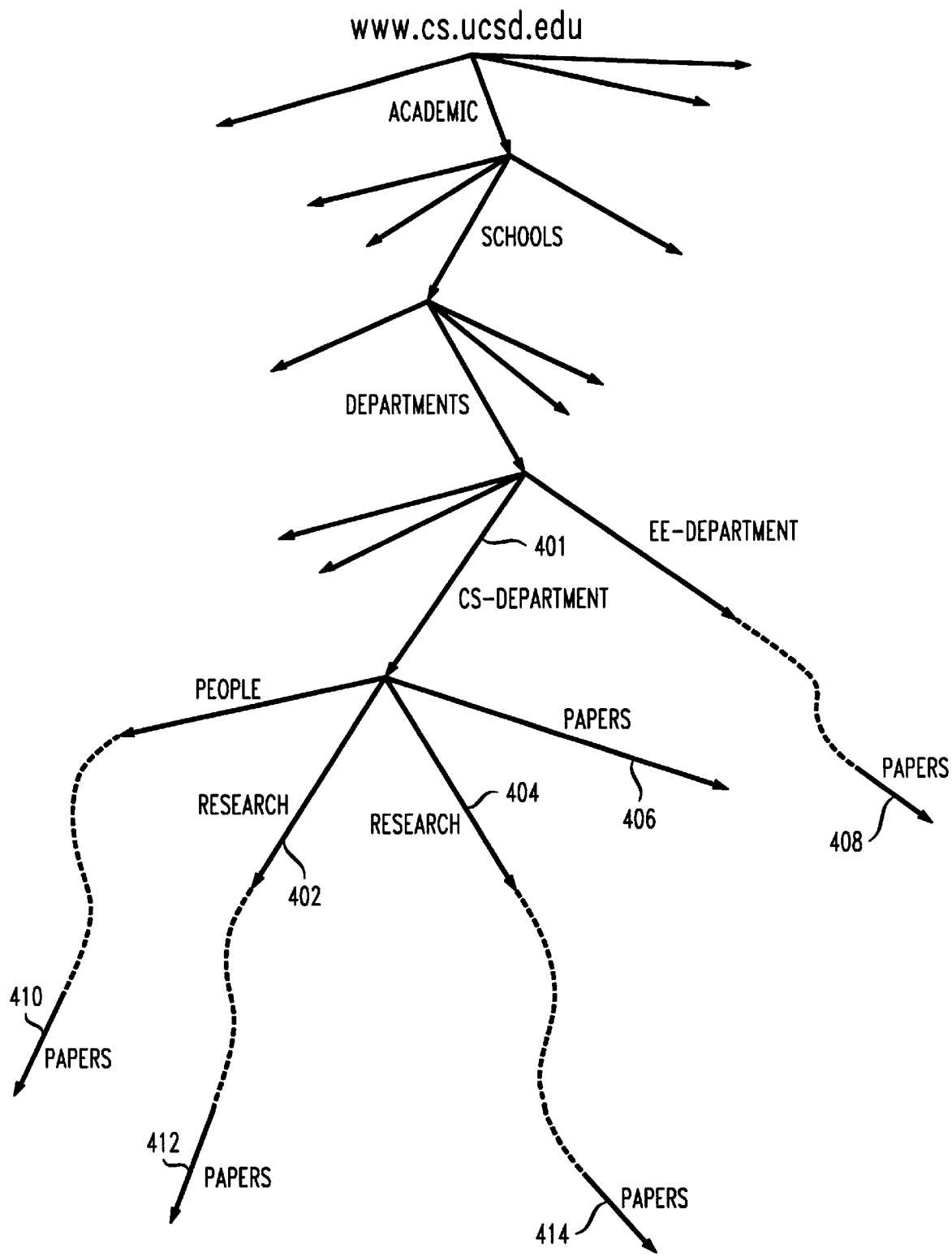
FIG. 4 is an edge-labeled tree modeling another one of the networks shown in FIG. 1.

FIG. 4 shows another edge-labeled tree 400 having a path Academic-Schools-Departments that leads to two edges CS-Department 401 and EE-Department. Below the CS-Department edge 401, are People, Research 402, Research 404 and Papers 406 edges. Papers edges 410, 412 and 414 are downstream to the People, the Research 402 and the Research 404 edges. A Papers edge 406 immediately follows the CS-Department's edge 401. A Papers 408 edge is under the EE-Department edge.

If the desired information is to identify all the papers in the CS-Department, a query for this information may be expressed in an expression such as:

Select "Papers".t

Where-*."CS-Department".-*."Papers".t in DB.

The above expression (1) selects all subtrees below (1) Papers edges that follow a CS-Department edge 401 with any number of intervening edges before or after this CS-Department edge 401. Thus, the above expression (1) would identify subtrees below Papers edges 410, 412, 414 and 406. However, Papers 408 is not included because Papers 408 follows an EE-Department edge.

The above Papers edges 410, 412, 414 and 406 form a view of the database. As time progresses, more papers are generated under the CS-Department edge 401. Thus, it is desirable to maintain the view of all the papers under the CS-Department edge 401 with minimum amount of processing power so that an up-to-date view of the total number of papers under the CS-Department may be maintained with minimum cost.

Figure 5:
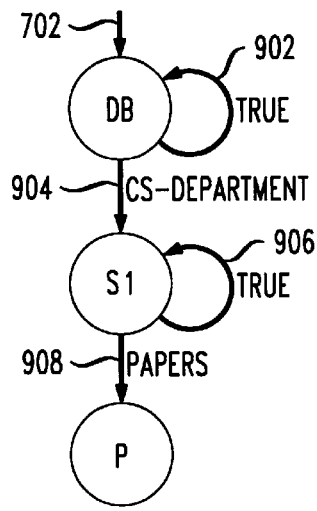
FIG. 5 shows an automaton that corresponds to a query.

FIG. 5 shows the automaton 900 having states DB, S1 and P. The automaton 900 corresponds to the expression (1). The state DB is a root state and the automaton is in the DB state at the beginning of the query. The true edge 902 is transitioned for all edges that are not CS-Department. When a CS-Department edge is encountered, the automaton transitions from state DB to state S1 through transition 904. The true transition 906 occurs when edges that are not Papers are encountered. When a Papers edge is encountered, the automaton transitions from state S1 to P through transition 908.

Figure 6:
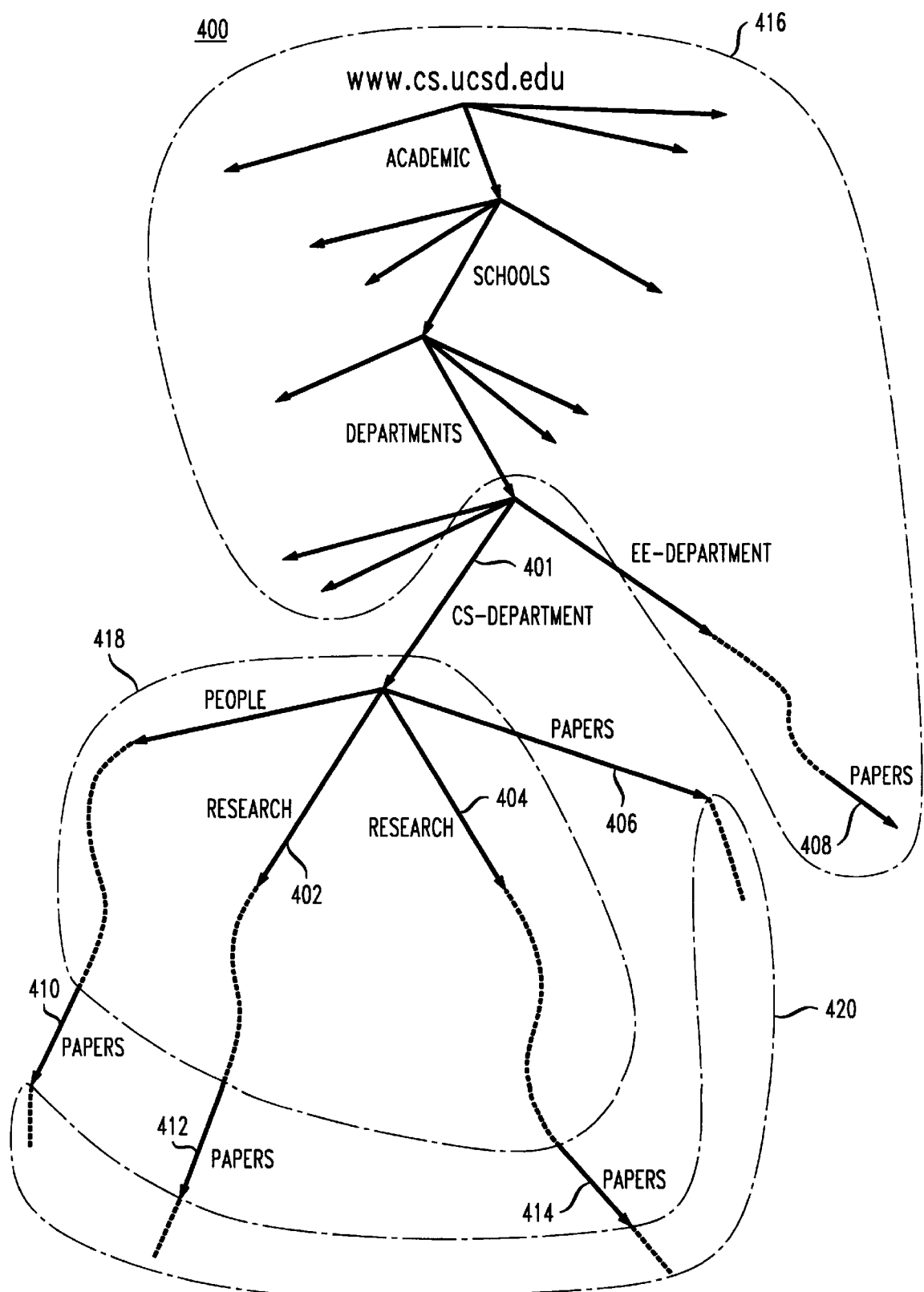
FIG. 6 shows the edge-labeled tree of FIG. 4 being decomposed into three portions.

FIG. 6 shows the edge-labeled tree 400 decomposed into three portions 416, 418 and 420 based on the expression (1) that represents the query for all the papers generated under a CS-Department edge 401. The portion 416 includes all the nodes and edges that precede the CS-Department edge 401; the portion 418 includes all the edges between the CS-Department edge 401 and the Papers edges 410, 412, 414 and 406; and the portion 420 includes all the edges that are below the Papers edges 410 , 412, 414 and 406. Decomposing the edge-labeled tree 400 as indicated above permits analyzing the effect of a change in the database represented by the edge-labeled tree 400 in three different perspectives corresponding to each of the decomposed portions 416, 418 and 420.

If $\Delta$ represents an addition to the database represented by the edge-labeled tree 400, then $\Delta$ may be added to any one of the decomposed portions 416, 418 and 420. The addition $\Delta$ is represented by a new subtree whose root node is connected to an existing node by a new edge. A new view of the database represented by the edge-labeled tree 400 that is generated by the expression (1) may be analyzed based on which one of the decomposed portions 416, 418 and 420 that $\Delta$ is added. Instead of reprocessing the complete updated database using the expression (1), only $\Delta$ is processed to update the original view to incorporate the addition represented by $\Delta$.

Depending on which portion 416, 418 and 420 that $\Delta$ is added a different update query is performed over $\Delta$ to obtain an update to an existing view. If $\Delta$ was added in portion 416, then the following expression corresponds to the update query:

Select "Papers".t (2)

Where-*."CS-Department".-*."Papers".t
in $\Delta$

The above expression (2) simply states that if $\Delta$ is added to the portion 416, then $\Delta$ may contain a CS-Department edge which in turn may precede a Papers edge. In terms of the automaton 900, portion 416 includes all the nodes and edges traversed by the true transition 902. Thus, the update query must correspond to the complete automaton with DB replaced by $\Delta$. Hence, the update query is substantially identical to the original query.

The original view must be updated to include any subtrees below a Papers edge that follow a CS-Department edge and that is contained in the update portion $\Delta$ (i.e. the automaton 900 must be traversed to reach state P for $\Delta$). The other portions 418 and 420 are not affected by $\Delta$ because regardless of the contents of $\Delta$, the results of expression (1) as applied to portions 418 and 420 still remain valid.

If $\Delta$ occurs in the portion 418, then the update to the original view is produced by the following expression:

Select t (3)

Where_*."Papers".t in $\Delta$.

The above expression (3) indicates that if the $\Delta$ was added to the portion 418, then any Papers edges that are in $\Delta$ are also under the CS-Department edge 401 and thus must be included in the view of all Papers edges that are under a CS-Department edge. In terms of the automaton 900, the portion 418 are all the nodes and edges that are traversed by the true edge 906. The update query corresponds to starting at state S1 and transitioning to state P through "Papers" edges. Thus, $\Delta$ must be searched to identify all subtrees below Papers edges for inclusion in the update of the original view.

If the $\Delta$ occurs in the portion 420, then a query is not required because the expression (1) produces a set of all subtrees that are below Papers edges that follow a CS-Department edge. In terms of the automaton 900, the portion 420 corresponds to all the node and edges represented by state P. Since P is a terminal state, portion 420 is the result of the original query and the update query is null. Thus, the update to the original view is simply the addition of $\Delta$.

Based on the above discussion, the database represented by the edge-labeled tree 400 may be decomposed by analyzing the automaton 900. The portion 416 contains all the nodes and edges of the edge-labeled tree 400 that may be traversed in state DB before taking the CS-Department transition; the portion 418 contains all the nodes and edges of the edge-labeled tree 400 that may be traversed in state S1 before taking the Papers transition; and the portion 420 contains all the nodes and edges of the edge-labeled tree 400 after the Papers transition. In general, for more complex expressions (or queries), the database is decomposed by identifying all the nodes and edges that may be traversed before moving from one state to another state.

The update queries corresponding to portions of the database are determined by defining update automatons which are obtained by making the root state Δ instead of DB and making each of the states corresponding to a particular portion a new root state and discarding all the states and transitions previous to the new root state. The resulting update query is applied to Δ if added to the corresponding portion of the database and the results of the update query is added to the view to update the view.

In summary, the processing for view maintenance is minimized by decomposing the database represented by an edge-labeled tree into a plurality of portions based on an automaton that models a query. An added portion Δ is processed by an expression that corresponds to the portion where the Δ is added. Thus, instead of processing the complete database using the expression that generated the original view, only the Δ portion is processed by an expression that is selected based on which decomposed portion of the database that the Δ is added.

Figure 7:
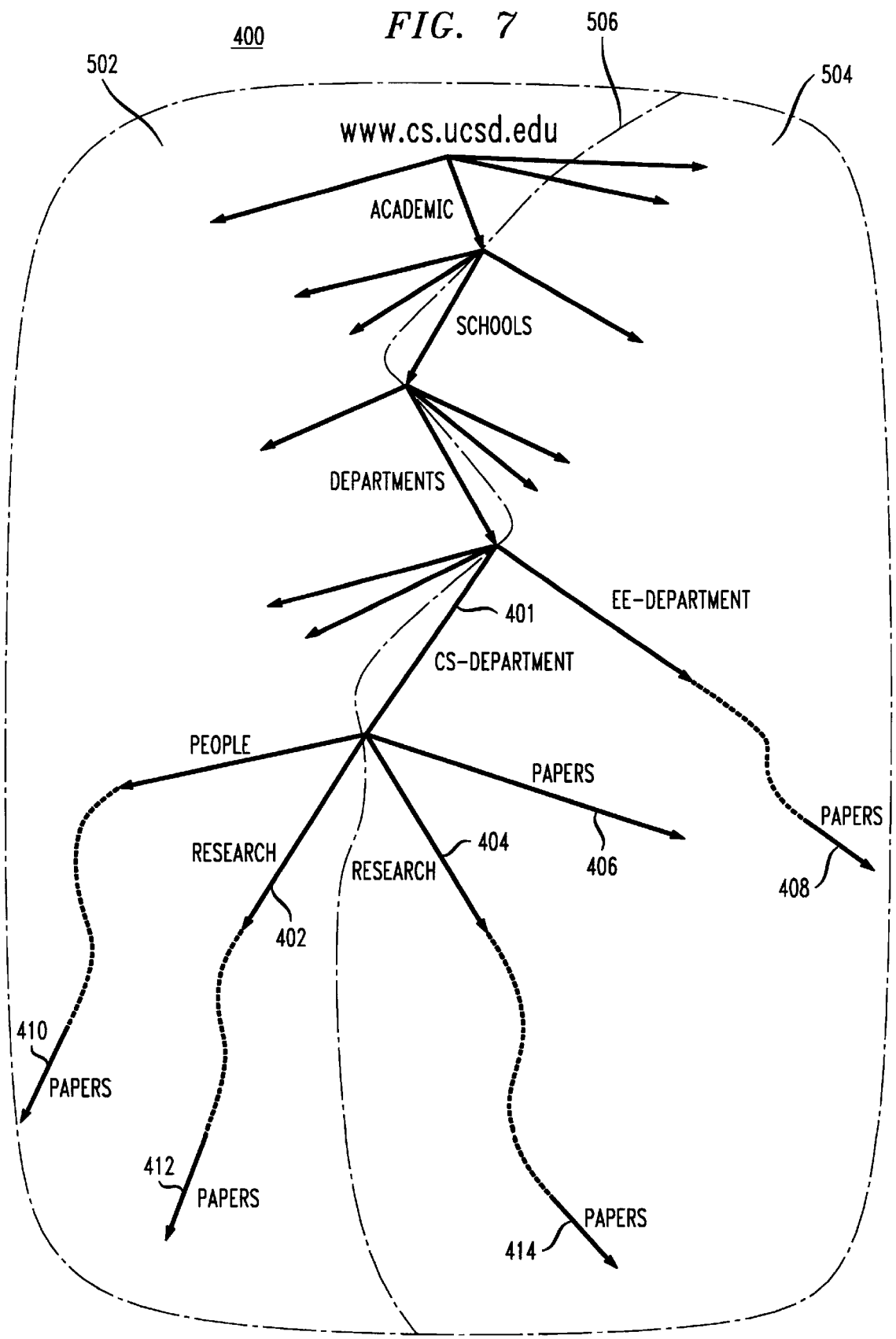
FIG. 7 shows the edge-labeled tree of FIG. 3 decomposed into two portions that is orthogonal to the decomposition of FIG. 6.

FIG. 7 shows the edge-labeled tree 400 decomposed into two portions 502 and 504 by line 506. Thus, the route node www.cs.uscd.edu and edges Academic, Departments, People, Research 402 and Papers 410 and 412 are in decomposed portion 502 while edges Schools, EE-Department, CS-Department, Research 404, Papers 414, 406 and 408 are in decomposed portion 504. The above decomposition corresponds to a database that represents information stored in separate portions of a network such as shown in FIG. 8.

Figure 8:
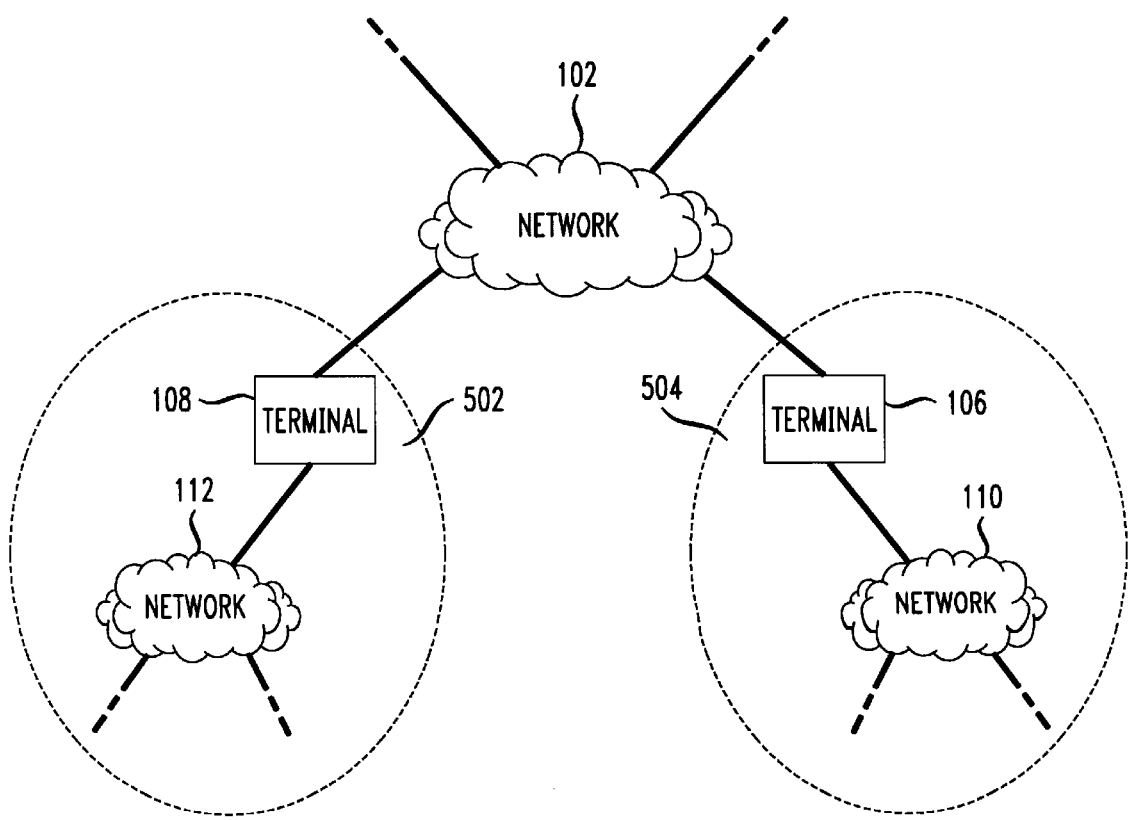
FIG. 8 shows a network division that corresponds to the decomposition of FIG. 7.

In FIG. 8, the terminal 108 and the network 112 are included in the decomposed portion 502 while terminal 106 and network 110 are included in the decomposed portion 504. The terminals 108 and 106 are connected by the network 102. Thus, if the query represented by expression (1) was performed in the terminal 108, the information contained in the portion 504 must be transferred to the terminal 108 through the network 102 in order for the terminal 108 to perform the query represented by the expression (1). Depending on the size of the database represented by the edge-labeled tree 400, such data transfers between the terminals 106 and 108 may be extremely large and time prohibitive. Thus, the following exemplary embodiments provide a method and apparatus for minimizing the data transfers between the terminals 106 and 108 through network 102 so that both time and cost are minimized.

Figure 9:
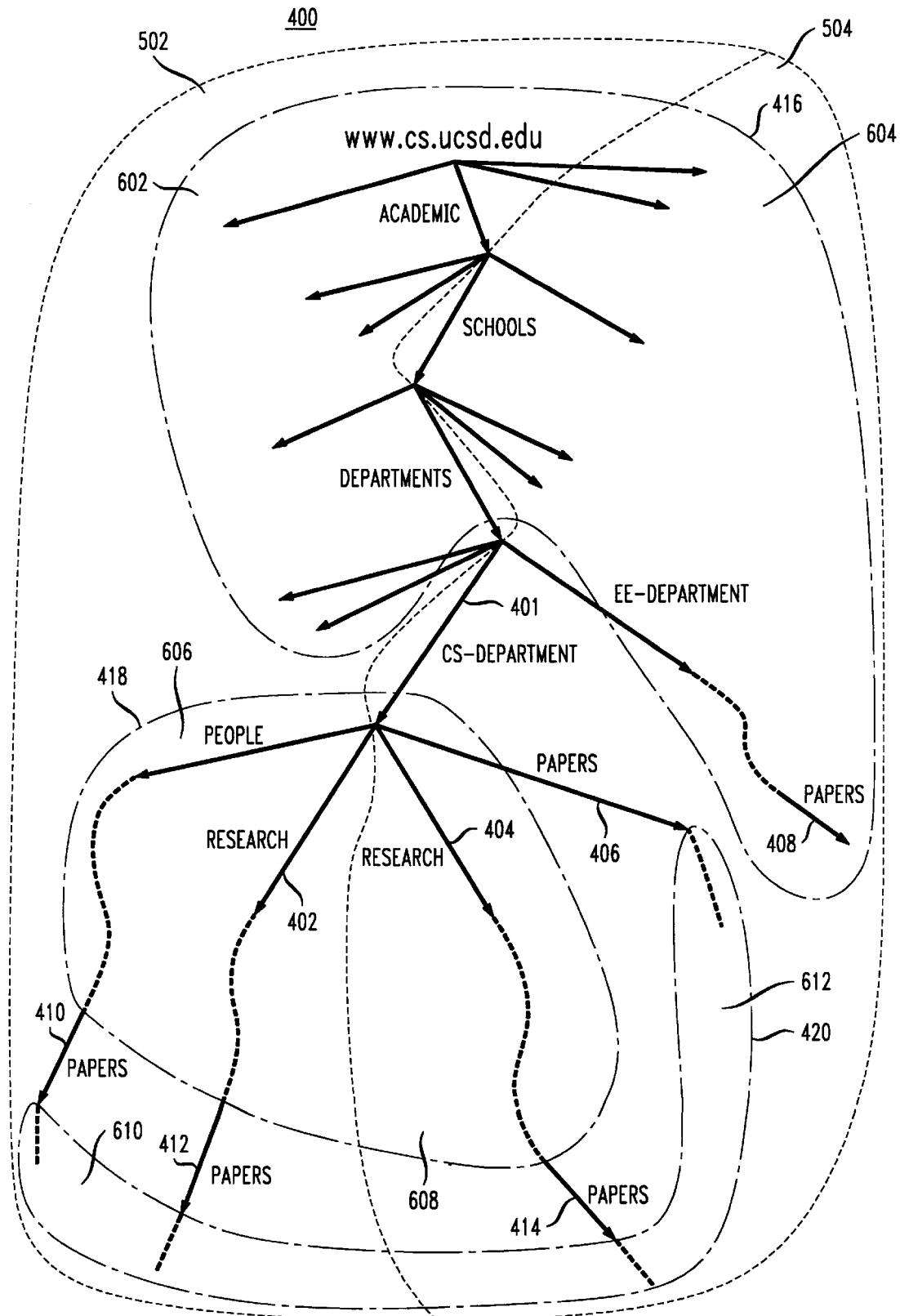
FIG. 9 shows the decompositions of FIG. 6 and FIG. 7 combined.

FIG. 9 shows the edge-labeled tree 400 decomposed into the three portions 416, 418 and 420 as well as portions 502 and 504. The superposition of both decompositions generates six different sub-decompositions 602, 604, 606, 608, 610 and 612. Analysis of a query such as represented by the expression (1) based on decomposition of the edge-labeled tree 400 into the six decomposed portions 602–612 enables a reduction of data transfers to achieve the query.

Figure 10:
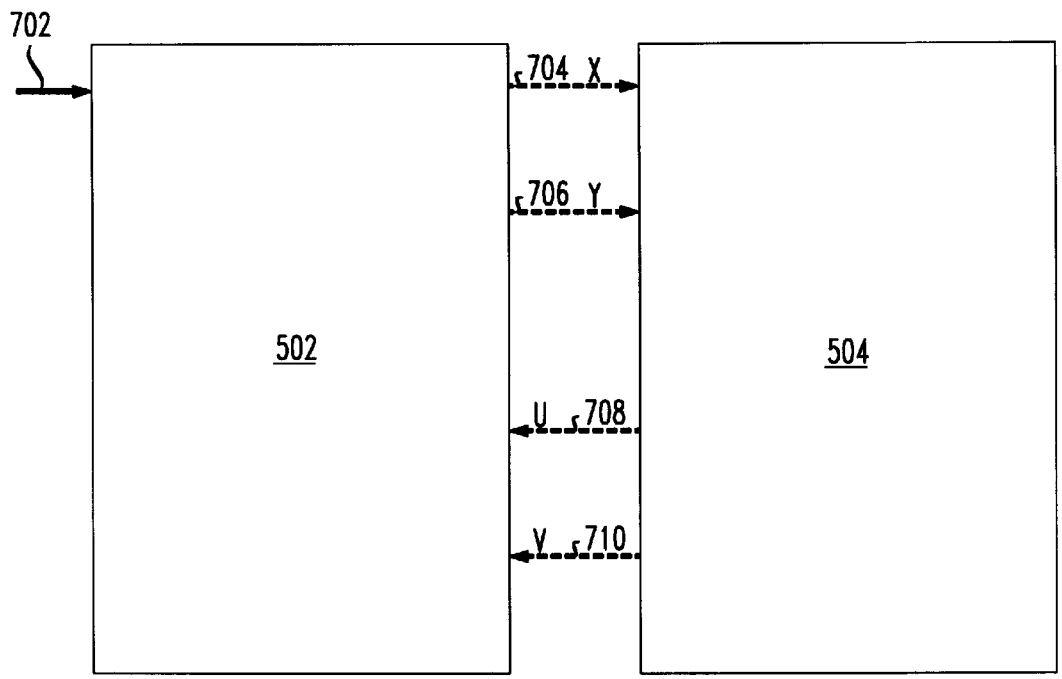
FIG. 10 shows a diagram of path connections between the decompositions shown in FIG. 7.

FIG. 10 shows a block diagram of the decomposed portions 502 and 504 interconnected by four paths X 704, Y 706, U 708 and V 710. The path 702 appearing on the left side of the portion 502 represents the entry into the route node of the edge-labeled tree 400.

X 704 and Y 706 are paths that exit portion 502. Thus, when the terminal 108 performs the query represented by the expression (1), X and Y paths 704 and 706 cannot be further processed because the edges that follows X and Y paths 704 and 706 are physically located in the portion 504 under the terminal 106.

When processing the query represented by the expression (1), the terminal 106 does not know at what stage of the query that X and Y paths 704 and 706 appear. This information may be obtained from the terminal 108 by transferring data between the terminals 106 and 108 through the network 102, however, for a practical database, a path may transition between portions 502 and 504 many times. Thus, exchanging path information between the terminals 106 and 108 as the query is processed may be time and cost prohibitive. Thus, in order to minimize the network traffic between the terminals 106 and 108, the terminal 106 processes each of the paths represented by X 704 and Y 706 from three different perspectives. Each perspective corresponds to each of the three portions 416, 418 and 420. The paths U 708 and V 710 are treated similarly with the roles of the terminals 106 and 108 reversed. Thus, each of the paths X 704, Y 706, U 708 and V 710 may be expanded into three subpaths assuming that each of the subpaths corresponds to one of the portions 416, 418 and 420.

Figure 11:
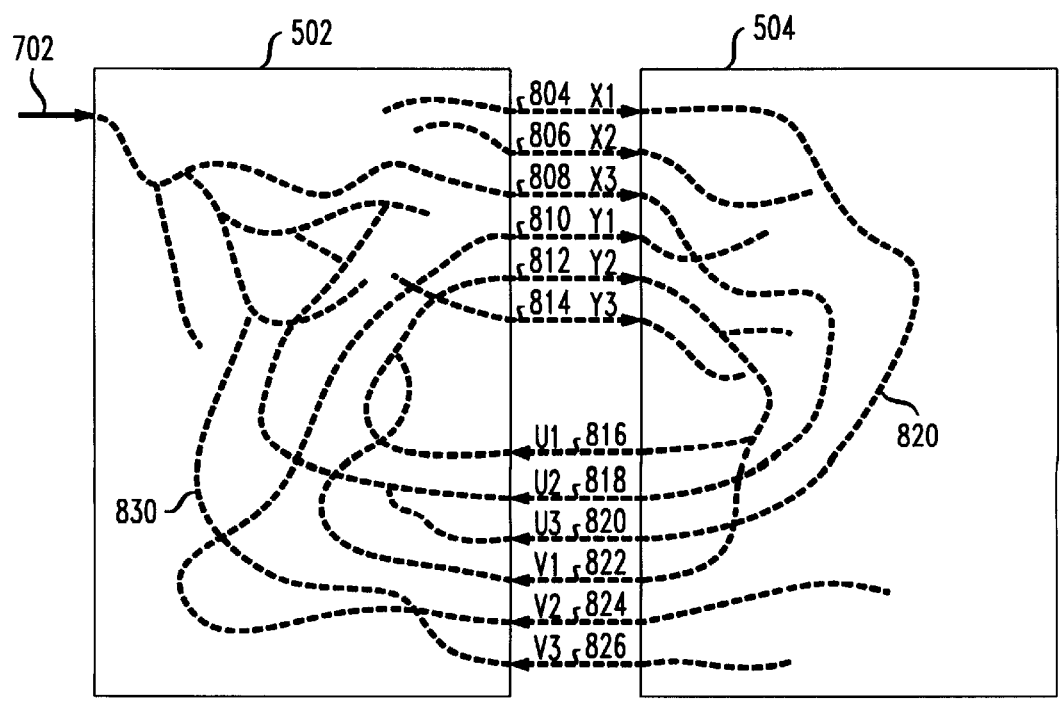
FIG. 11 shows the path connections shown in FIG. 10 expanded corresponding to each of the decompositions shown in FIG. 6.

FIG. 11 shows the expanded subpaths X1 804, X2 806, X3 808, Y1 810, Y2 812, Y3 814, U1 816, U2 818, U3 820, V1 822, V2 824 and V3 826. The subpaths X1–Y3 may be linked to subpath U1–V3 through internal paths 830 and 828 within each of the portions 502 and 504, respectively. The interconnection of all the paths forms the edge-labeled tree 400.

Each of the terminals 106 and 108 processes the expression (1) based on the subpaths 804–826. After separate performance of the query, the results generated by the terminal 106 may be transferred to the terminal 108 through the network 102. The terminal 108 combines the results of the terminal 106 with its own results to generate a view of the database produced by the expression (1). Thus, the data transfers between the terminals 106 and 108 is reduced to a single transfer of potentially much less volume.

A further optimization may be obtained by determining whether each of the subpaths exists considering the connections between the subpaths 804–814, 816–826, the paths leading from the route node represented by 702, as well as the automaton 900 representing the expression (1).

A status of each of the subpaths 804–814 may be assigned by determining which state of the automaton 900 is reached when the terminal 108 reaches the path X 704 and path Y 706. If, for example, a path leads from edge 702 to the X path 704 when the automaton is in state S1, then X1 and X3 does not exist and may be ignored. If the terminal 108 transfers this information to the terminal 106, then not only will the terminal 106 save processing power by not processing the X1 804 and X3 808 subpaths, but the results of the processing will be more accurate following only the subpath X2 806 so that more accurate subpaths 816–826 may be produced (i.e. some subpaths 816–826 may not exist and can be ignored).

The existence of some of the subpaths 804–814 may not be clearly determined because the subpaths 804–814 may be connected to subpaths 816–826 thus forming loops between the portions 502 and 504. For this situation, the query must be performed for all the subpaths in such loops and the existence of the subpaths can only be determined after the results of the terminal 106 are combined with the results of the terminal 108.

Thus, to reduce the amount of processing required of terminal 106 as well as reducing the amount of data transferred between the terminals 108 and 106, the terminal 108 first processes the decomposed portion 502 and determines the existence of any of the subpaths 804–814. The result of this process is transferred to the terminal 106 before the terminal 106 generates a partial query result that is to be returned to the terminal 108. Thus, the process performed by the terminal 106 may be better directed by receiving preliminary information from the terminal 108.

The query is decomposed into subqueries corresponding to portions 416, 418 and 420 discussed above. Thus, the terminal 106 processes X1 804 using expression (1), X2 806 using expression (2) and the subtree below X3 is completely transferred to the terminal 108.

For the general case, the paths X 704, Y 706, U 708 and V 710 are decomposed into a plurality of subpaths depending on the number states in an automaton that models a query of interest. For each of the subpaths, the terminals 106 and 108 (or other additional terminals) process sub-queries that correspond to the subpaths. The terminal 108 may first determine the existence of each of the subpaths and the result transferred to one of the terminals 106 and 108 to further optimize processing. Where more than two terminals are involved, each of the terminals perform the tasks described above and the initial processing for existence of subpaths propagates from the terminal that contains the root node to all the nodes.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A method for applying a query to a distributed database that may be represented by an edge-labeled tree and that is decomposed into first portions, comprising:

identifying paths of the edge-labeled tree that represents the distributed database, each of the paths exiting from one of the first portions and entering another one of the first portions, paths that exit one of the first portions being exiting paths and paths that enter one of the first portions being entering paths, each of the exiting paths correspond to one of the entering paths;

decomposing the query into sub-queries;

applying at least one of the sub-queries to the entering paths; and combining results of the sub-queries into a result of the query.

2. The method of claim 1, wherein the decomposing the query step comprises:

modeling the query as an automaton having a plurality of states, the automaton having a root state; and defining a plurality of sub-automatons corresponding to each of the states of the automaton, each of the sub-automatons corresponding to one of the sub-queries.

3. The method of claim 2, wherein the defining step comprises:

selecting a state of the automaton;

defining the selected state as a root state of one of the sub-automatons; and deleting all states and transitions prior to the selected state.

4. The method of claim 2, wherein the applying step comprises applying all the sub-queries to each of the entering paths.

5. The method of claim 2, wherein the applying step comprises:

decomposing the distributed database into second portions, each of the second portions corresponding to one of the sub-queries;

determining information regarding from which of the second portions each of the exiting paths exits;

selecting a sub-query that corresponds to the second portions for each of the exiting paths; and applying selected sub-queries to respective entering paths that correspond to each of the exiting paths.

6. The method of claim 5, wherein the determining step comprises:

determining whether each of the exiting paths may be traced to a root of the edge-labeled tree;

identifying which of the second portions immediately precedes each of the exiting paths if each of the exiting paths is traceable to the root; and identifying all the second portions as corresponding to an exiting path if the exiting path is not traceable to the root.

7. The method of claim 5, wherein the decomposing the distributed database step comprises assigning to one of the second portions of the distributed database all the edges and nodes of the edge-labeled tree that may be traversed without transitioning out of one of the states of the automaton.

8. The method of claim 5, further comprising:

transferring results of the determining step to terminals processing entering paths;

selecting sub-queries based on transferred results;

applying only selected sub-queries to the corresponding entering paths; and applying all sub-queries to entering paths that have no corresponding selected sub-queries.

9. The method of claim 8, wherein the transferring step begins at a terminal that contains the root of the edge-labeled tree, then each of the terminals transferring the information to other terminals.

10. An apparatus that applies a query to a distributed database that may be represented by an edge-labeled tree and that is decomposed into first portions, comprising:

a network;

a plurality of terminals coupled to the network, each of the terminals containing one of the first portions, wherein paths of the edge-labeled tree that represents the distributed database exiting from one of the first portions contained in one of the terminals and entering another one of the first portions contained in another of the terminals, paths that exit one of the first portions being exiting paths and paths that enter one of the first portions being entering paths, each of the exiting paths correspond to one of the entering paths, the plurality of terminals:

decomposing the query into sub-queries;

applying at least one of the sub-queries to the entering paths; and combining results of the sub-queries into a result of the query.

11. The apparatus of claim 10, wherein the terminals applies all the sub-queries to each of the entering paths.

12. The apparatus of claim 10, wherein the terminals generate the sub-queries based on an automaton that models the query, the automaton having a plurality of states and a root state, each of the sub-queries corresponding to one of the states of the automaton.

13. The apparatus of claim 12, wherein the terminals generate the sub-queries by:

selecting a state of the automaton;

defining the selected state as a root state of a sub-automaton;

deleting all states and transitions prior to the selected state; and generating a sub-query that corresponds to the sub-automaton.

14. The apparatus of claim 12, wherein the terminals:

decompose the distributed database into second portions, each of the second portions corresponding to one of the sub-queries;

determine from which of the second portions each of the exiting paths exits;

select a sub-query that corresponds to the second portions for each of the exiting paths; and applies selected sub-queries to respective entering paths that correspond to each of the exiting paths.

15. The apparatus of claim 14, wherein the terminals determine from which of the second portions each of the exiting paths exits by:

determining whether each of the exiting paths may be traced to a root of the edge-labeled tree;

identifying which of the second portions immediately precedes each of the exiting paths if each of the exiting paths is traceable to the root; and identifying all the second portions as corresponding to an exiting path if the exiting path is not traceable to the root.

16. The apparatus of claim 14, wherein the terminals decompose the distributed database by assigning to one of the second portions of the distributed database all the edges and nodes of the edge-labeled tree that may be traversed without transitioning out of one of the states of the automaton.

17. The apparatus of claim 14, wherein each of the terminals:

transfers information regarding which of the second portions each of the exiting paths contained in each of the terminals exits to other terminals that are processing corresponding entering paths;

selects sub-queries based on transferred results received from other terminals;

applies only selected sub-queries to corresponding entering paths contained in each of the terminals; and applies all sub-queries to entering paths that have no corresponding selected sub-queries.

18. The apparatus of claim 17, wherein one of the terminals that contains the root of the edge-labeled tree begins transferring the information and then each of the terminals may transfer the information to other terminals.

* * * * *